United States Patent [19]
Yoshioka et al.

[11] Patent Number: 5,467,284
[45] Date of Patent: Nov. 14, 1995

[54] OBSTACLE DETECTION SYSTEM FOR MOTOR VEHICLE

[75] Inventors: Tohru Yoshioka, Hatsukaichi; Hiroki Uemura, Kure; Tadayuki Niibe, Hiroshima; Ayumu Doi; Ken-ichi Okuda, both of Hatsukaichi; Yasunori Yamamoto, Higashi-Hiroshima; Tomohiko Adachi, Hatsukaichi; Naotsugu Masuda, Hiroshima, all of Japan

[73] Assignee: Mazda Motor Corporation, Hiroshima, Japan

[21] Appl. No.: 247,206

[22] Filed: May 20, 1994

[30] Foreign Application Priority Data

May 24, 1993 [JP] Japan .................................. 5-121087

[51] Int. Cl.⁶ .................................................. G06F 165/00
[52] U.S. Cl. .................... 364/461; 364/426.04; 340/903; 340/435; 180/169
[58] Field of Search ............................ 364/426.04, 460, 364/461; 180/167–169, 176–179; 342/454, 455; 340/901, 903, 904, 435, 436

[56] References Cited

U.S. PATENT DOCUMENTS

| 4,970,653 | 11/1990 | Kenue | 364/461 |
| 5,172,315 | 12/1992 | Asanuma et al. | 180/169 |
| 5,172,317 | 12/1992 | Asanuma et al. | 180/169 |
| 5,249,128 | 9/1993 | Markandey et al. | 364/461 |
| 5,309,137 | 5/1994 | Kajiwara | 340/436 |

FOREIGN PATENT DOCUMENTS

| 51-7892 | 3/1976 | Japan . |
| 1-297133 | 8/1989 | Japan . |

Primary Examiner—Gary Chin
Attorney, Agent, or Firm—Keck, Mahin & Cate

[57] ABSTRACT

An obstacle detection apparatus for a motor vehicle detects another vehicle traveling in front of the vehicle as an obstacle. The apparatus has a first unit, providing a course on which the vehicle is supposed to travel, a second unit, providing a reserve course located outside of the course, an obstacle detector detecting the other vehicle traveling in the course or the reserve course as an obstacle, and an obstacle detection continuation unit continuously detecting the other vehicle until a predetermined condition has been satisfied when the other vehicle moves from the course to the reserve course.

12 Claims, 5 Drawing Sheets

OBSTACLE DETECTION SYSTEM FOR MOTOR VEHICLE

BACKGROUND OF THE INVENTION

1. Field of the Invention

The present invention relates to an obstacle detection system for motor vehicle and, in particular, to an obstacle detection system for a motor vehicle which detects an obstacle ahead of the motor vehicle in order to avoid contact with the obstacle.

2. Description of the Related Art

The conventional obstacle detection system for a motor vehicle includes means for estimating a course on which the vehicle is supposed to travel based on the driving conditions of the vehicle, such as a steering angle and/or a vehicle speed. The obstacle detection system can detect the obstacle ahead with which the vehicle has a high possibility of contacting, with high accuracy, by using a radar device scanning a wide scope and picking up only the information of the obstacle on the course estimated by the above estimating means among the information obtained by the radar device. Such conventional obstacle detection system for a motor vehicle is disclosed in, for example, Japanese Patent Publication No. 51-7892.

The above-mentioned obstacle detection system detects the obstacle ahead only if it is located on the course estimated, since the system judges that vehicle has the highest possibility of contacting with the obstacle on this course. Thus, when detecting the obstacle on the course, the obstacle detecting system informs the driver of this fact so that the driver operates the vehicle while taking care to avoid the obstacle ahead. On the contrary, when the obstacle on the course is not detected, the driver still operates the vehicle on the course knowing of no obstacle on the course.

However, the above-mentioned conventional obstacle detection system does not detect an obstacle on another course located just outside of the course estimated. It should be noted that the vehicle has the second highest possibility of contacting with the obstacle located on the outside course though the vehicle has the highest possibility of contact with the obstacle on the course estimated. Further, the conventional detection system does not detect a vehicle traveling in front of the vehicle as the obstacle when the vehicle traveling in front of the vehicle moves toward the outside course from the course estimated. As a result, since the driver operates the vehicle with little consideration of the obstacle existing on the outside course, the driver's operations for avoiding the contact with the obstacle are delayed. Such driver's operation includes an operation of having a necessary distance between the vehicle and the obstacle ahead, an operation of reducing the vehicle speed, a steering operation and the like. The delay of the driver's operations for avoiding the contact with the obstacle is a problem to be solved.

On the other hand, a conventional vehicle control system is also disclosed in, for example, Japanese Patent Laid-Open No. 1-197133. The vehicle control system is used to have the vehicle travel with safety. The vehicle control system includes means for controlling the vehicle, so as to follow the specific vehicle traveling ahead, based on the traveling conditions of these two vehicles. Since the vehicle with the vehicle control system is automatically controlled so as to follow the vehicle traveling ahead, the vehicle can travel, with safety, keeping the necessary distance between the vehicle and the vehicle traveling ahead as long as the vehicle ahead travels with safety.

However, the vehicle with the vehicle control system has a possibility of following the vehicle traveling ahead even when the vehicle ahead travels with no safety. Further, the vehicle control system generally does not include the device for detecting an obstacle located ahead. Therefore, if the obstacle exists ahead or the vehicle to be followed becomes an obstacle, a rapid operation for avoiding contact with the obstacle could not be carried out. Moreover, even where the vehicle to be followed travels ahead with safety, the vehicle could not follow the vehicle traveling ahead when the vehicle ahead moves toward the course located at the outside of the course on which the vehicle ahead was traveling previously. When the vehicle to be followed becomes an obstacle, even if the vehicle control system includes the device for detecting the obstacle ahead, the detection device could not detect the obstacle ahead when the vehicle ahead moves toward the outside course.

SUMMARY OF THE INVENTION

It is, therefore, an object of the present invention to provide an obstacle detection system for a motor vehicle which can detect the vehicle traveling ahead as an obstacle even when the vehicle moves toward the course located at the outside of the course on which the vehicle was traveling previously.

It is another object of the present invention to provide an obstacle detection system for a motor vehicle which can enhance an ability of detecting an obstacle ahead so that the vehicle can travel with safety.

The above object is achieved, according to one aspect of the present invention, by providing an obstacle detection system for a motor vehicle detecting another vehicle traveling in front of the vehicle as an obstacle, said system comprising course providing means for providing a course on which the vehicle is supposed to travel, reserve course providing means for providing a reserve course located outside of the course, detection means for detecting another vehicle traveling in the course or the reserve course as an obstacle, and obstacle detection continuation means for continuously detecting the other vehicle until a predetermined condition has been satisfied when the other vehicle moves from the course to the reserve course.

In a preferred embodiment of the present invention, the predetermined condition is that a predetermined time period has passed.

In another preferred embodiment of the present invention, the predetermined condition is that the other vehicle has moved outside of the course and the reserve course.

The above objects are achieved, according to another aspect of the present invention, by providing an obstacle detection apparatus for a motor vehicle detecting another vehicle traveling in front of the vehicle as an obstacle, said system comprising a first unit providing a course on which the vehicle is supposed to travel, a second unit providing a reserve course located outside of the course, an obstacle detector detecting another vehicle traveling in the course or the reserve course as an obstacle, and an obstacle detection continuation unit continuously detecting the other vehicle until a predetermined condition has been satisfied when the other vehicle moves from the course to the reserve course.

The above and other objects and features of the present invention will be apparent from the following description and by making reference to the accompanying drawings employed for illustrating preferred embodiments of the present invention.

BRIEF DESCRIPTION OF THE DRAWINGS

In the accompanying drawings.

DETAILED DESCRIPTION OF THE PREFERRED EMBODIMENTS

Hereinafter, the preferred embodiments of the present invention will be explained with reference to the drawings.

Figure 1:
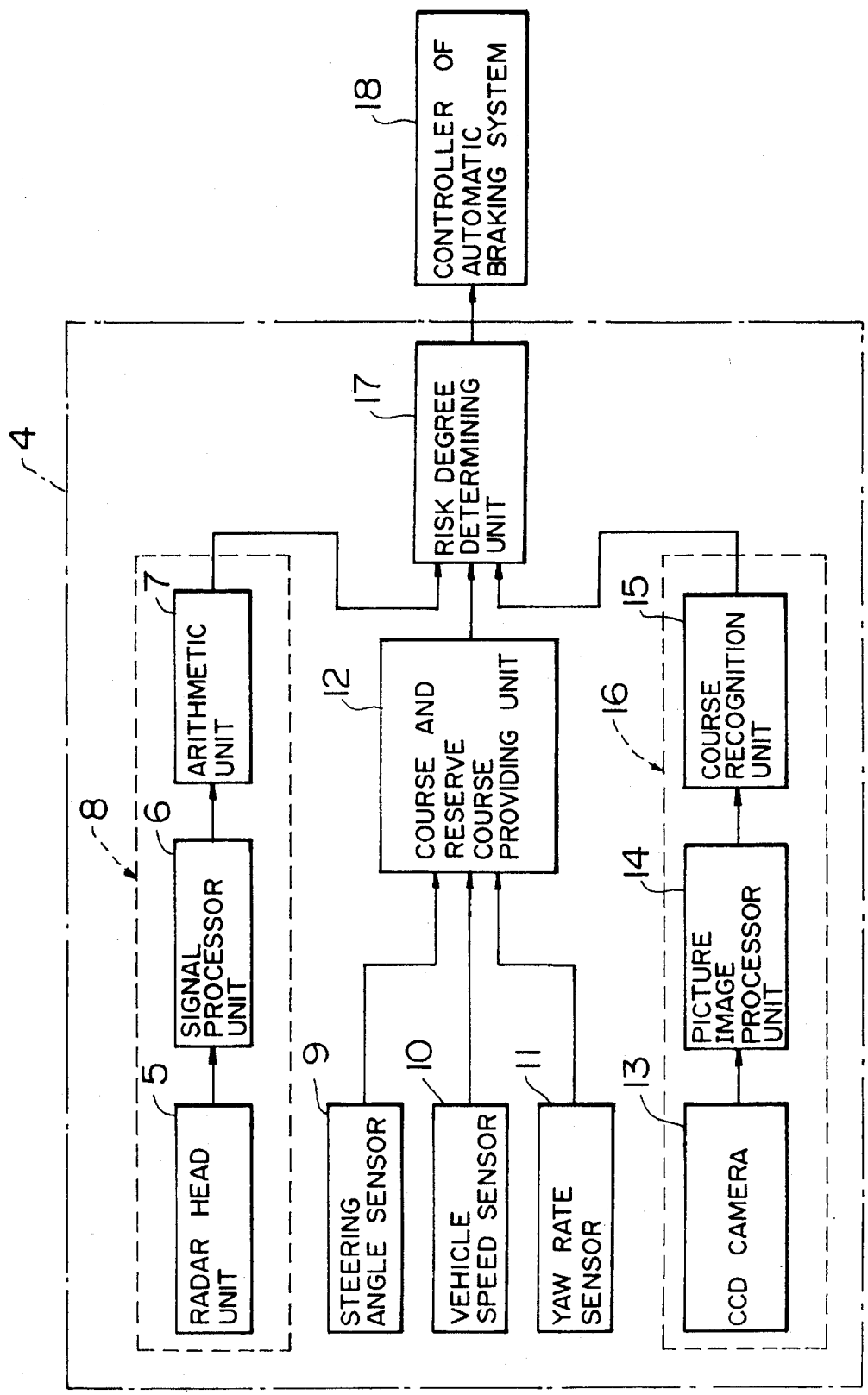
FIG. 1 is a block diagram showing an obstacle detection system for a motor vehicle in accordance with an embodiment of the present invention.

FIG. 1 is a block diagram showing an obstacle detection system for a motor vehicle in accordance with an embodiment of the present invention. An obstacle detection system is provided in an automatic braking system which automatically applies braking force to respective wheels of a vehicle. The obstacle detection system sends information of the obstacle detected to the automatic braking system.

Referring to FIG. 1, an obstacle detection system 4 includes a scanning radar device 8 which has a radar head unit 5, a signal processor unit 6 and an arithmetic unit 7. The radar head unit 5 is attached to the front side of the vehicle and includes a transmitting portion from which a pulse laser beam is transmitted toward an obstacle such as another vehicle traveling in front of the vehicle and a receiving portion on which the reflecting wave reflected on the obstacle is received. The radar head unit 5 scans the laser beam transmitted from the transmitting portion in a wide range in the horizontal direction. The radar head unit 5 sends a signal through the processor unit 6 to the arithmetic unit 7 which calculates a distance and a relative speed between the vehicle and the obstacle in front of the vehicle by using the time delay between the transmitting time and the receiving time in the received laser beam. Thus, the scanning radar device 8 detects an obstacle existing on a predetermined area in front in the vehicle.

The obstacle detection system 4 further includes a steering angle sensor 9 for detecting a steering angle of a steering wheel, a vehicle speed sensor 10 for detecting a vehicle speed and a yaw rate sensor 11 for detecting a yaw rate of the vehicle body. The signals from the respective sensors 9-11 are input to a course and reserve course providing unit 12 which estimates a course A (see FIG. 3) on which the vehicle is supposed to travel hereafter and provides the course A and further provides a reserve course B (see FIG. 3) located at both sides of the course A as estimated and provided.

The obstacle detection system 4 further includes a traveling area detection device 16 which has a CCD camera 13, a picture image processor unit 14 and a course recognition unit 15. The CCD camera 13 is attached to the front side of the vehicle and displays a picture view spreading in front of the vehicle in a predetermined scope. The picture view displayed by the CCD camera is sent to the course recognition unit 15 through the picture image processor unit 14. The course recognition unit 15 recognizes a traveling area by picking up the lines located at both sides of the road on which the vehicle is traveling from the picture view. Thus, the traveling area detection device 16 can detect a corner of a road when a vehicle is traveling the corner as described below.

The obstacle detection system 4 still further includes a risk degree determining unit 17. The obstacle information from the radar unit 8 or the arithmetic unit 7, the information from the course and reserve course providing unit 12 and the detection information from the traveling area detection device 16 or the course recognition unit 15 are input to the risk degree determining unit 17. Then, the risk degree determining unit 17 determines the risk degrees of the obstacles detected by the radar device 8 based on the information from the course and reserve course providing unit 12 and the detection information from the traveling area detection device 16. Thereafter, the risk degree determining unit 17 outputs the information (the distance and the relative speed between the vehicle and the obstacle) regarding the obstacle with the high degree of the risk to a controller 18 of an automatic braking system. Finally, the controller 18 judges the possibility of the vehicle contacting with the obstacle and then controls the automatic braking system and operates an alarm buzzer (not shown) so as to avoid the risk.

Next, there will be explained how the obstacle detection system of the present invention detects the obstacle in front of the vehicle with the reference to FIG. 2.

Figure 2:
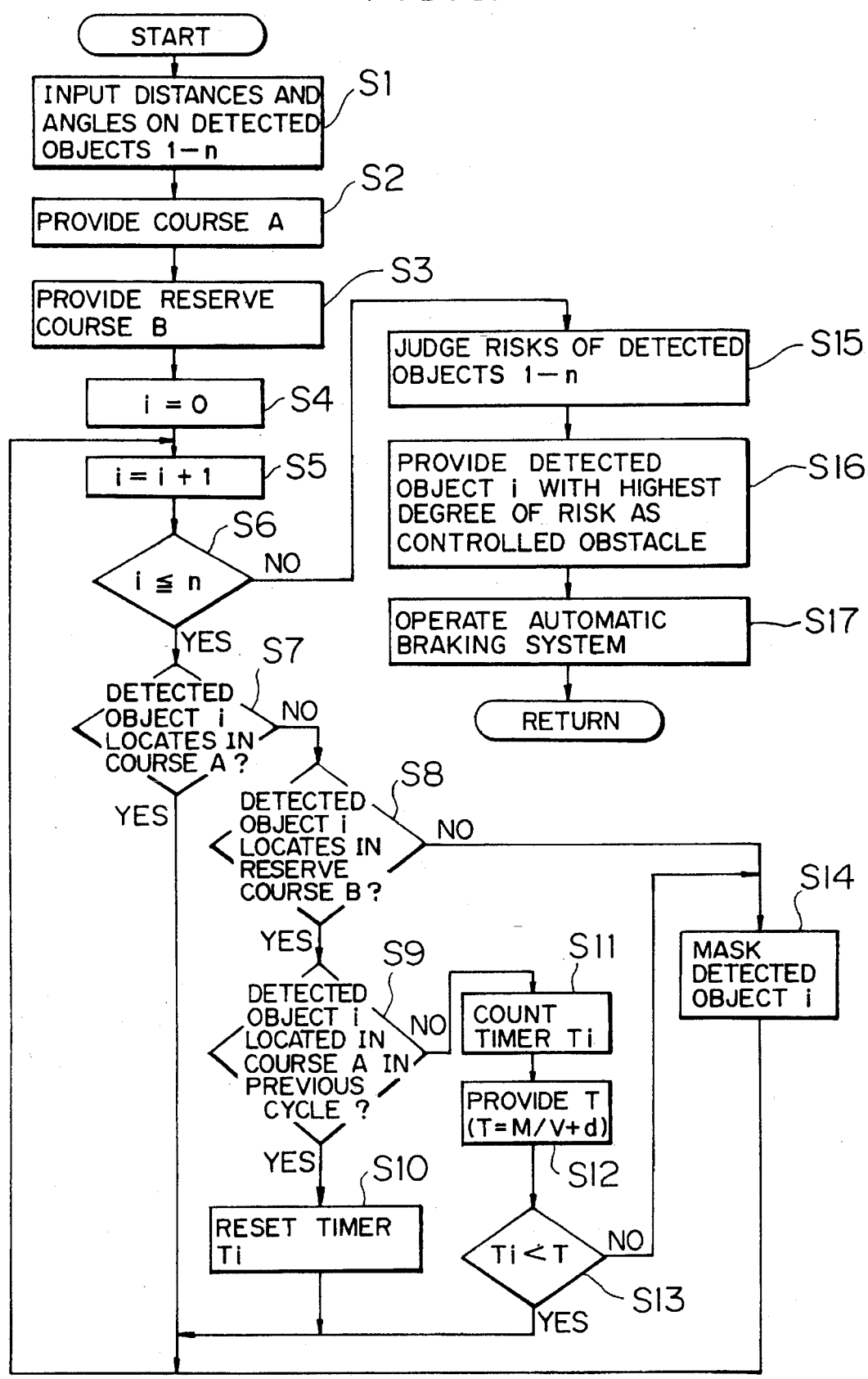
FIG. 2 is a flow chart showing a control operation of an obstacle detection system for a motor vehicle in accordance with an embodiment of the present invention.

Referring to FIG. 2, after starting, distances and angles between the vehicle (corresponding to vehicle C in FIG. 6) and detected objects 1-n (corresponding to vehicle E in FIG. 6) obtained based on the various signals from the radar unit 8 are input to the course and reserve course providing unit 12 in step S11. Then, the course A (see FIG. 6) on which the vehicle is supposed to travel hereafter is provided by the course and reserve course providing unit 12 in step S2, and the reserve course B (see FIG. 6) located at both sides of the course A is provided by the course and reserve course providing unit 12 in step S3.

Thereafter, the detected object i is initialized by setting i=0 in step S4, and the detected object i is updated by setting i=i+1 in step S5. Then, it is determined whether or not the procedures of all of the detected objects 1-n have been terminated in step S6. When the answer is YES in step S6, it is determined whether or not the detected object i is located in the course A in step S7.

When the answer is YES in step S7, the procedure goes back to step S5 and proceeds to the same steps. On the other hand, when the answer is NO in step S7, the procedure proceeds to step S8 in which it is determined whether or not the detected object i is located in the reserve course B. The procedure proceeds to step S9 when the answer is YES in step S8, and the procedure proceeds to step S14 when the answer is NO in step S8. In step S14, the detected object i is masked and then the procedure goes back to step S5 again.

In step S9, it is determined whether or not the detected object i was located in the course A in the previous cycle. When the answer is YES in step S9, the procedure proceeds to step S10 in which the timer Ti regarding the detected object i is reset to be zero. When the answer is NO in step S9, the procedure proceeds to step S11 in which the timer Ti starts to be counted. Then, in step S12, the time period T for continuing the detection of the object is provided by the equation (T=M/V+d) where T is a width of the reserve course B, V is a vehicle speed and d is a constant. Next, it is determined whether or not Ti is less than T in step S13.

When the answer is YES in step S13, the procedure goes back to step S5 and, when the answer is NO step S13, the procedure proceeds to step 14, in which the detected object i is masked, and then goes back to step S5 again.

Thereafter, when the answer is NO in step S6, the procedure proceeds to step S15 in which the risks regarding the respective detected objects i are judged. Next, the detected object i with the highest degree of risk is provided as an obstacle to be controlled in step 16 and, for example, the automatic braking system is finally operated so as to avoid the risk such as the contact with the obstacle in step 17.

In the embodiment of the present invention, in step S7, it is determined whether or not the detected object i is located in the course A by using the scanning radar device 8. In step S3, the reserve course B located at both sides of the course A is provided by the course and reserve course providing unit 12. Further, in steps S8–14, the vehicle E is continuously detected as an obstacle until the timer Ti has counted the time period T mentioned above when the vehicle E, detected as an obstacle, moves from the course A to the reserve course B. Here, the time period T is variable based on the width M and the vehicle speed V. That is, the time period T has a large value when the width M is large and the vehicle speed V is small.

According to the embodiment of the present invention, the reserve course B is provided at both sides of the course A, and the obstacle detection system continuously detects the vehicle E traveling ahead as an obstacle until the predetermined time period T has passed when the vehicle E traveling ahead moves from the course A to the reserve course B. As a result, the vehicle with the obstacle detection system can travel with safety.

Next, there will be explained other embodiments of the present invention with reference to FIGS. 3–9.

Figure 3:
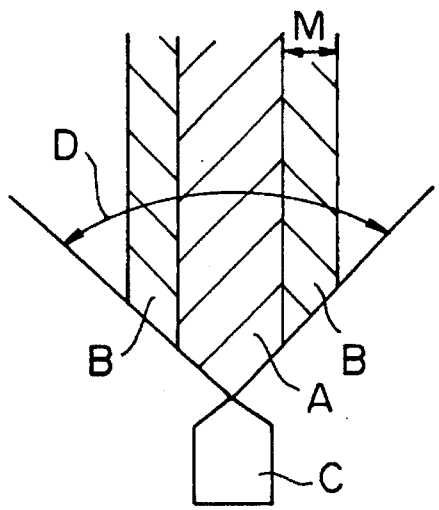
FIG. 3 is a plan view for explaining how a reserve course is provided when the distance between a vehicle and another vehicle traveling in front of the vehicle is short in accordance with another embodiment of the present invention.
Figure 4:
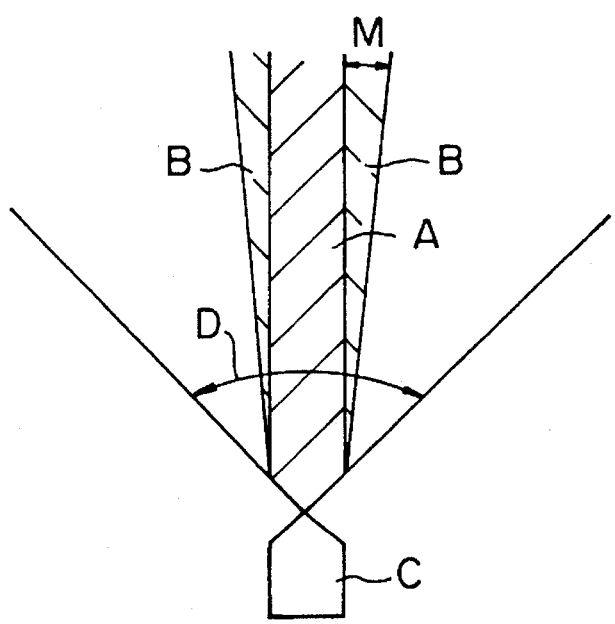
FIG. 4 is a plan view for explaining how a reserve course is provided when the distance between a vehicle and another vehicle traveling in front of the vehicle is long in accordance with another embodiment of the present invention.

Referring to FIGS. 3 and 4, the course and reserve course providing unit 12 may change the width M of the reserve course B based on the distance between the vehicle C and the vehicle E traveling ahead. Namely, as shown in FIG. 3, when the distance between the vehicle C and the vehicle E traveling ahead is short, the width M of the reserve course B located at both sides of the course A is provided widely from the location just in front of the vehicle C in the scanning scope D of the radar device.

On the other hand, as shown in FIG. 4, when the distance between the vehicle C and the vehicle E traveling ahead is long, the width M of the reserve course B is provided to be narrow at the location just in front of the vehicle C and to spread gradually to the location far from the vehicle C in the scanning scope D of the radar device.

According to the embodiment of the present invention shown in FIGS. 3 and 4, the obstacle detection system can detect the vehicle E traveling in front of the vehicle C steadily regardless of the distance between the vehicle C and the vehicle E traveling ahead.

Figure 5:
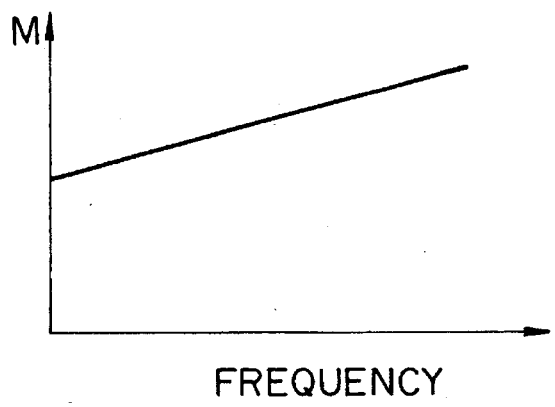
FIG. 5 is a graph showing the relationship between a frequency of unintentional movement of steering and a width M of a reserve course in accordance with another embodiment of the present invention.

Referring to FIG. 5, the course and reserve course providing unit 12 may change the width M of the reserve course B based on frequency of unintentional movement of the steering of the vehicle C. Namely, the movement of the vehicle E ahead in the width direction becomes large relatively as the frequency of unintentional movement of the steering of the vehicle C becomes large. If the width M of the reserve course B is provided to be constant, the vehicle E ahead might be not detected. Therefore, according to the present invention, as shown in FIG. 5, the width M of the reverse course B is provided to be wide as the frequency of the unintentional movement more than 0.5 Hz of the steering of the vehicle C increases. As a result, according to this embodiment of the present invention, the obstacle detection system can detect the vehicle E traveling in front of the vehicle C steadily regardless of the frequency of the unintentional movement of the steering of the vehicle C.

Figure 6:
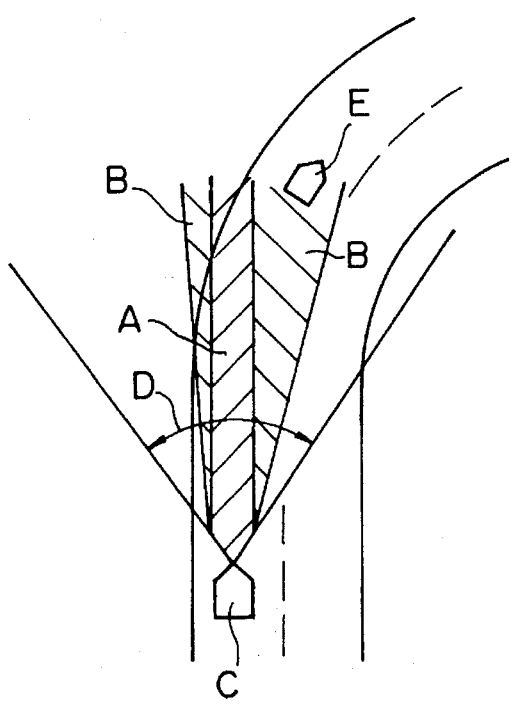
FIG. 6 is a plan view for explaining how a reserve course is provided when a vehicle is traveling at a corner of a road in accordance with another embodiment of the present invention.

Referring to FIG. 6, the course and reserve course providing unit 12 may change the width M of the reserve course B when the vehicle C is traveling in a corner of a road. Namely, the corner of the road is detected by the traveling area detection device 16 in advance when the vehicle C goes into the corner of road, and the width M of the reserve course B located at the inside of the corner is provided so as to be wide. According to this embodiment of the present invention, the obstacle detection system can steadily detect the vehicle E traveling in front of the vehicle C in the corner of the road although it is easy for the vehicle E traveling in the corner of the road to be undetected.

Figure 7:
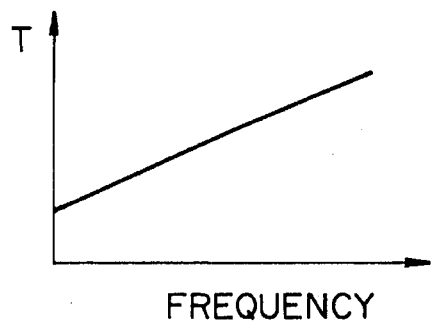
FIG. 7 is a graph showing the relationship between a time period T for continuing the detection and a frequency of unintentional movement of steering in accordance with another embodiment of the present invention.

The time period T for continuing the detection mentioned above may be provided as follows. Namely, the time period T is increased or decreased based on the behavior of the vehicle E traveling ahead (the unintentional movement in the width direction of the vehicle E against the vehicle C). More specifically, as shown in FIG. 7, the time period T is provided to be long in proportion to the unintentional movement of the steering of the vehicle E (frequency of the unintentional movement more than a predetermined frequency f). According to this embodiment of the present invention, the obstacle detection system can detect the vehicle E traveling in front of the vehicle C steadily regardless of the behavior of the vehicle E because the time period T is provided to be long even though the vehicle E is easy to be undetected by the behavior thereof.

Further, the time period T may be changed when the vehicle is traveling in a corner of a road. Namely, as shown in FIG. 6, the corner of the road is detected in advance by the traveling area detection device 16 when the vehicle C goes into the corner of road, and then the time period T is provided to be long when the vehicle E is located at the entrance of the corner of the road. According to this embodiment of the present invention, the obstacle detection system can certainly detect the vehicle E traveling in front of the vehicle C in the corner of the road although the vehicle E traveling in the corner of the road is easy to be undetected.

Figure 8:
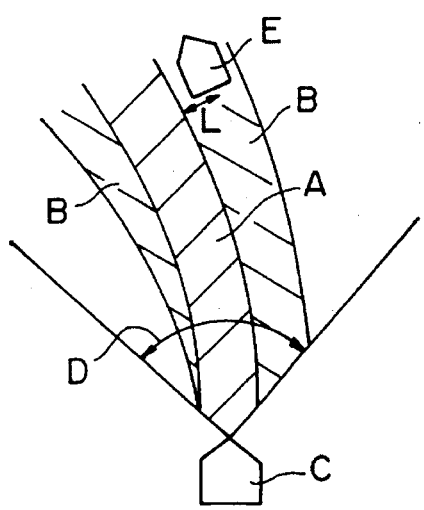
FIG. 8 is a plan view showing the condition that the vehicle E ahead moves from the course A to the reserve course B.
Figure 9:
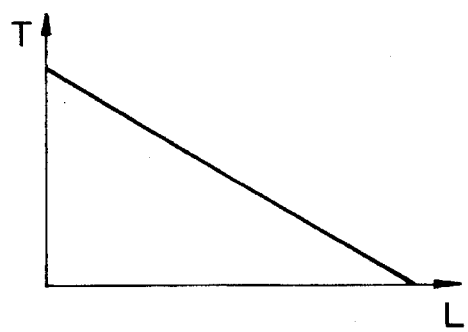
FIG. 9 is a graph showing the relationship between a time period T for continuing the detection and the length L of movement of the vehicle ahead E shown in FIG. 8 in accordance with another embodiment of the present invention.

Referring to FIGS. 8 and 9, the time period T may be provided based on the length L of the movement of the vehicle when the vehicle E moves from the course A to the reserve course B. Namely, the time period T is provided to be short when the length L is large since the risk degree reduces as the length L is increased. On the other hand, the time period T is provided to be long when the length L is small since the risk degree increases as the length L reduces. According to this embodiment of the present invention, the time period T necessary to have the vehicle C travel with safety can be provided preferably.

Still further, the vehicle E traveling in front of the vehicle C may be continuously detected without providing the time period T as long as the vehicle E is located in the reserve course B. The obstacle detection system may stop to detect the vehicle E when the vehicle E moves to the outside of the course A and the reserve road B. According to this embodiment of the present invention, the vehicle C can travel with much safety.

Although the present invention has been explained with reference to specific, preferred embodiments, one of ordinary skill in the art will recognize that modifications and improvements can be made while remaining within the scope and spirit of the present invention. The scope of the present invention is determined solely by the appended claims.

What is claimed is:

1. An obstacle detection system for a motor vehicle which detects another vehicle traveling in front of the motor vehicle as an obstacle comprising:

course providing means for providing a course on which the motor vehicle is supposed to travel;

reserve course providing means for providing a reserve course located outside of the course on which the motor vehicle is supposed to travel;

detection means for detecting the other vehicle traveling in one of the course on which the motor vehicle is supposed to travel and the reserve course as an obstacle; and obstacle detection continuation means for continuously detecting the other vehicle until a predetermined condition has been satisfied when the other vehicle moves from the course on which the motor vehicle is supposed to travel to the reserve course.

2. An obstacle detection system according to claim 1, wherein said predetermined condition is that a predetermined time period has passed.

3. An obstacle detection system according to claim 2, wherein said obstacle detection continuation means is adapted to change the predetermined time period based on a behavior of the other vehicle.

4. An obstacle detection system according to claim 2, wherein said obstacle detection continuation means is adapted to change the predetermined time period based on a distance moved by the other vehicle when the other vehicle moves from the course on which the vehicle is supposed to travel to the reserve course.

5. An obstacle detection system according to claim 1, wherein said reserve course providing means is adapted to change a width of the reserve course based on a distance between the motor vehicle and the other vehicle.

6. An obstacle detection system according to claim 1, wherein said reserve course providing means is adapted to change a width of the reserve course based on a frequency of unintentional steering movement of the vehicle.

7. An obstacle detection system according to claim 1, wherein said predetermined condition is that the other vehicle has moved outside of both the course on which the vehicle is supposed to travel and the reserve course.

8. An obstacle detection system according to claim 2, and further comprising traveling area detection means for detecting a corner of a road on which the motor vehicle is supposed to travel and wherein said obstacle detection continuation means is adapted to increase the predetermined time period when the traveling area detection means has detected the corner of the road.

9. An obstacle detection system according to claim 1, and further comprising traveling area detection means for detecting a corner of a road on which the motor vehicle is supposed to travel and wherein said reserve course providing means is adapted to increase a width of the reserve course when the traveling area detection means has detected the corner of the road.

10. An obstacle detection apparatus for a motor vehicle which detects another vehicle traveling in front of the motor vehicle as an obstacle comprising:

a first unit providing a course on which the motor vehicle is supposed to travel;

a second unit providing a reserve course located outside of the course on which the motor vehicle is supposed to travel;

an obstacle detector detecting the other vehicle traveling in one of the course on which the motor vehicle is supposed to travel and the reserve course as an obstacle; and an obstacle detection continuation unit continuously detecting the other vehicle until a predetermined condition has been satisfied when the other vehicle moves from the course on which the motor vehicle is supposed to travel to the reserve course.

11. An obstacle detection apparatus according to claim 10, wherein said predetermined condition is that a predetermined time period has passed.

12. An obstacle detection apparatus according to claim 10, wherein said predetermined condition is that the other vehicle has moved outside of both the course on which the vehicle is supposed to travel and the reserve course.

* * * * *